Jan. 9, 1951 F. E. D'HUMY ET AL 2,537,657

DISK TYPE MAGNETIC RECORDING-REPRODUCING APPARATUS

Filed May 5, 1945 3 Sheets-Sheet 1

INVENTORS
F. E. d'HUMY
R. J. WISE

BY [signature]

ATTORNEY

Jan. 9, 1951 F. E. D'HUMY ET AL 2,537,657

DISK TYPE MAGNETIC RECORDING-REPRODUCING APPARATUS

Filed May 5, 1945 3 Sheets-Sheet 2

INVENTORS
F. E. d'HUMY
R. J. WISE

BY [signature]

ATTORNEY

DISK TYPE MAGNETIC RECORDING-REPRODUCING APPARATUS

Filed May 5, 1945 3 Sheets-Sheet 3

INVENTORS
F. E. d'HUMY
R. J. WISE
BY
N. F. Presson
ATTORNEY

Patented Jan. 9, 1951

2,537,657

UNITED STATES PATENT OFFICE 2,537,657

DISK TYPE MAGNETIC RECORDING-REPRODUCING APPARATUS

Fernand E. d'Humy, Scarsdale, N. Y., and Raleigh J. Wise, Dunellen, N. J., assignors to The Western Union Telegraph Company, New York, N. Y., a corporation of New York Application May 5, 1945, Serial No. 592,094

3 Claims. (Cl. 179—100.2)

This invention relates to magnetic recording and retransmitting apparatus, and more particularly to a facsimile telegraph exchange system in which novel and improved recording devices at a central or exchange station enable facsimile messages received over an incoming line to be stored and retransmitted over an outgoing line to the place of destination or to another exchange office, without requiring the messages to be reproduced in facsimile at the exchange station.

In facsimile telegraph systems at present in use, the incoming messages from a calling patron or originating office are received at the central station and are recorded there on an electrosensitive recording blank or in some instances photographically on sensitized film, after which the subject matter thus recorded has to be rescanned by a transmitting optical pickup device for retransmission to the called patron or office of destination. This operation results in an appreciable loss in detail of the reproduced subject matter; there is also involved loss in time in the retransmission of the messages, and the additional expense incurred by the use of electrosensitive recording paper or photographic film necessary to record the messages for subsequent retransmission. Moreover, there is an undesirable lack of secrecy involved since the subject matter recorded on the blanks at the central station unavoidably is disclosed to numerous persons attending the recording and retransmitting facsimile machines.

One of the objects of the invention is to avoid the foregoing and other disadvantages attendant to facsimile reception and retransmission at a central or other exchange office.

Another object is to provide suitable means for the reception and retransmission of facsimile messages at an exchange station, without the necessity of reproducing the messages in visual or readable form at such station.

An additional object is an improved recording element for receiving and storing the facsimile signals magnetically pending the retransmission thereof, which recording element may be used repeatedly for succeeding messages, and which facilitates handling and requires a minimum of manual attention and supervision.

A further object is to provide a simple and effective means for insuring proper synchronization of a facsimile sending or receiving set at a patron's office or other station with respect to the recording and retransmitting means at the exchange station.

Other objects and advantages will be apparent from the following detailed description of two illustrative embodiments of the invention, taken in connection with the accompanying drawings, in which.

Figures 5, 6, 7:
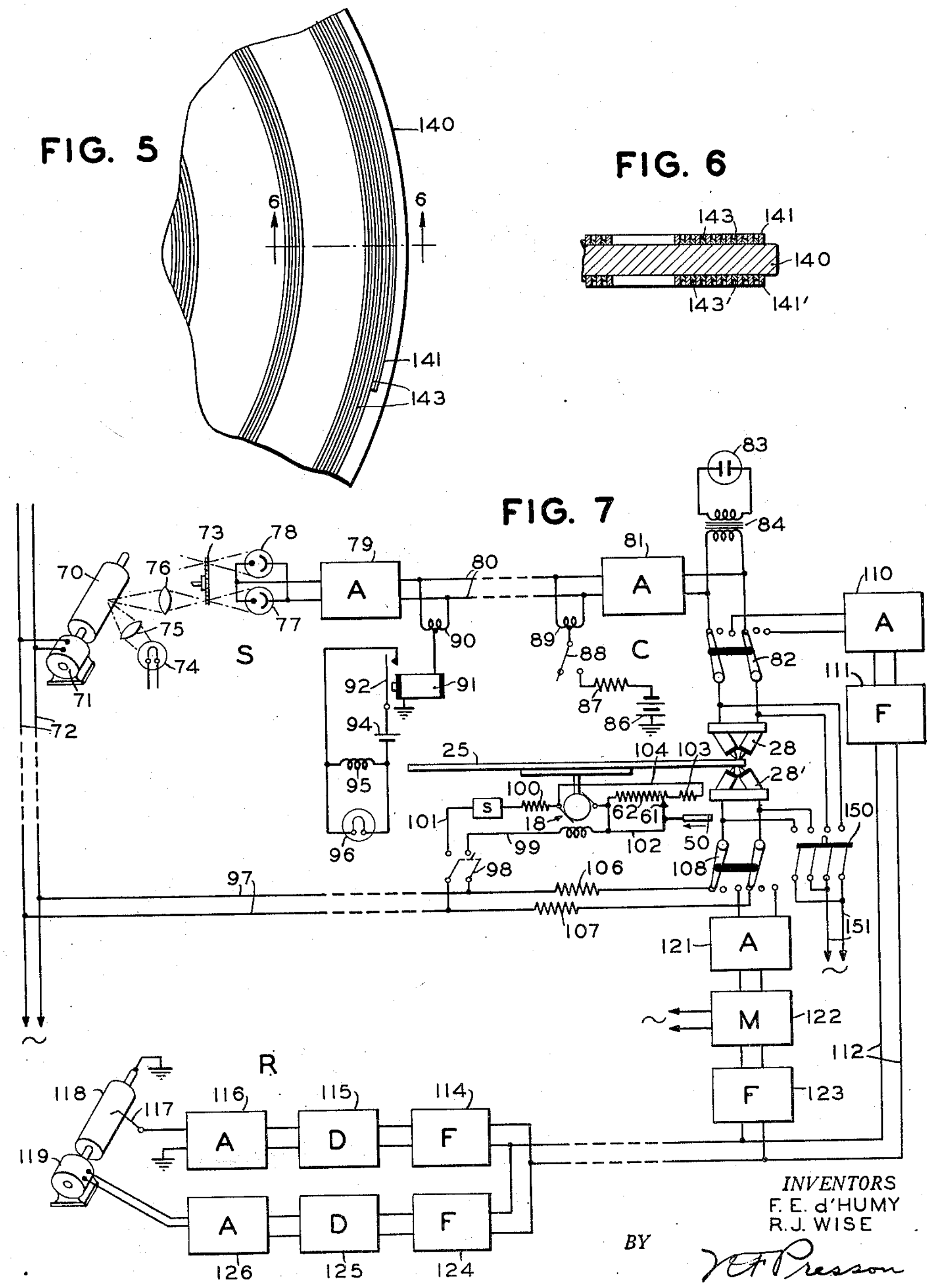
Fig. 5 is a fragmentary plan view of a modified form of recording and retransmitting element.
Fig. 6 is a sectional view taken along the line 6—6 of Fig. 5.

Fig. 7 schematically shows certain inter-office connections which may be employed in a system of the character disclosed.

Figures 1, 4:
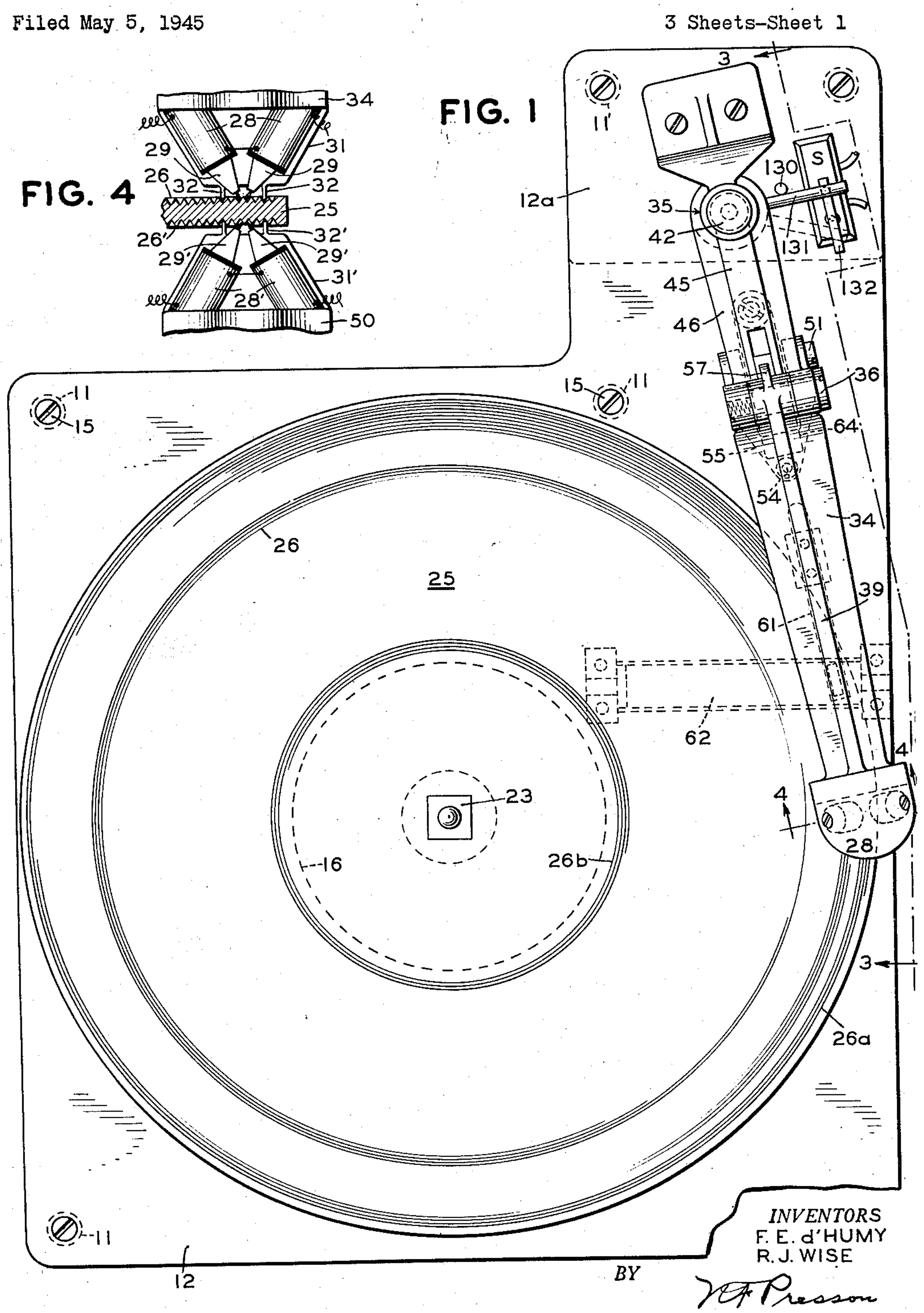
Fig. 1 is a top plan view of a facsimile recorder utilizing a magnetizable storing and retransmitting element constructed in accordance with one form of the invention.
Fig. 4 is an enlarged fragmentary view taken along the line 4—4 of Fig. 1, showing certain details of the magnetic recording and reproducing elements.
Figure 2:
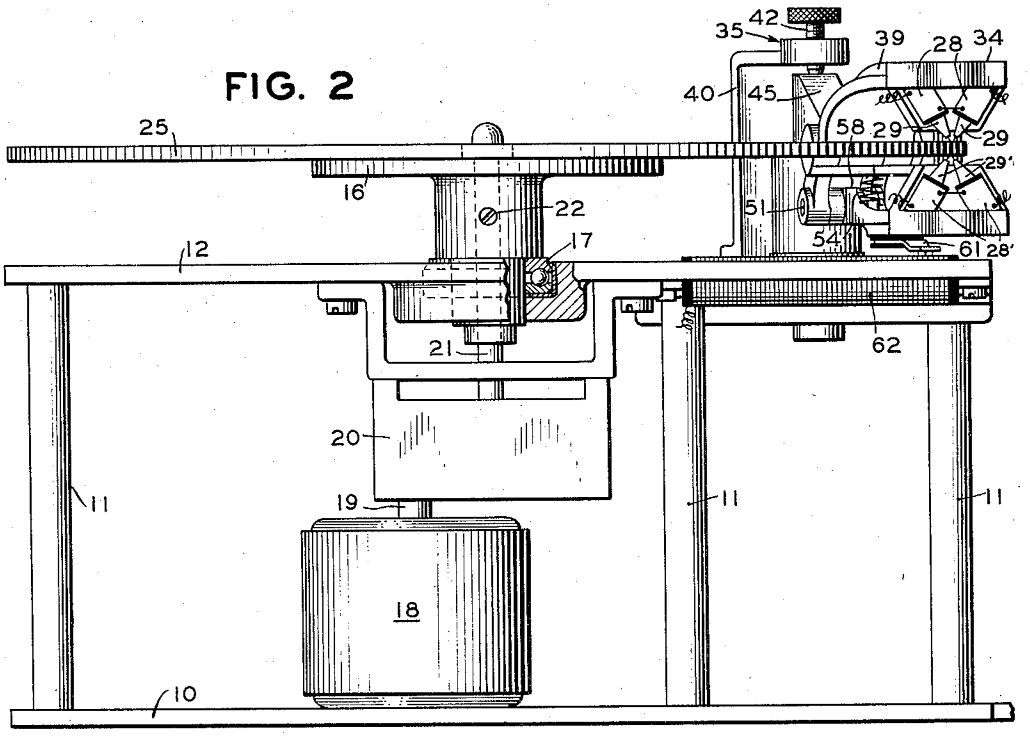
Fig. 2 is a front view, in elevation, of the recorder of Fig. 1.
Figure 3:
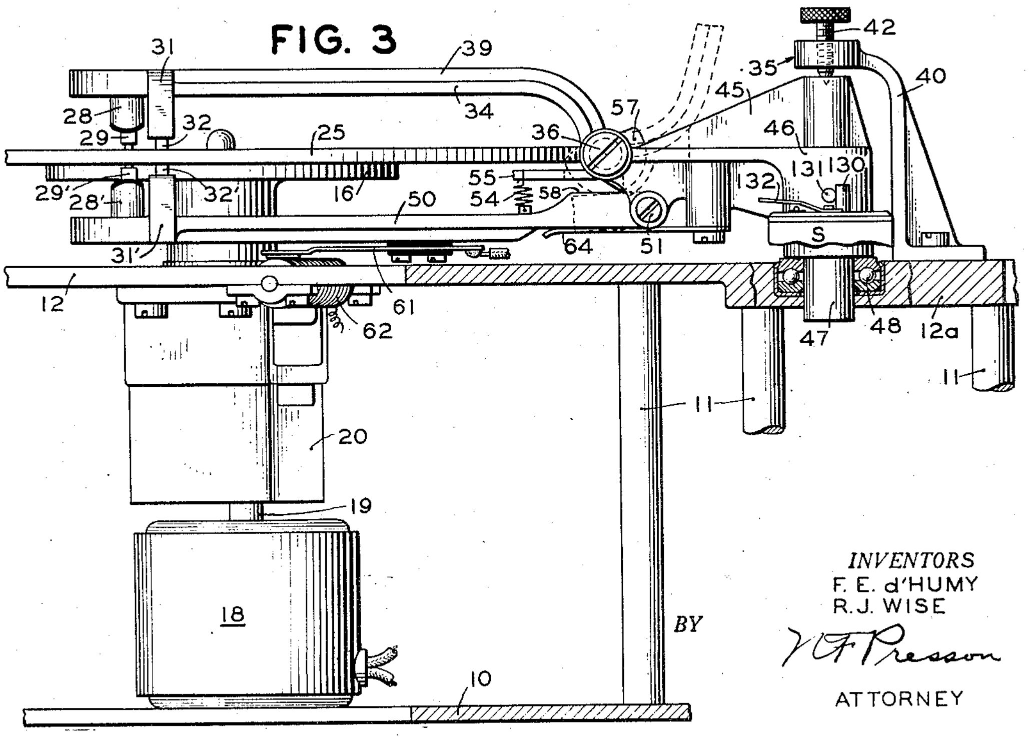
Fig. 3 is a view in elevation, taken along the line 3—3 of Fig. 1.

Referring particularly to Figs. 1 to 3 of the drawings, there is shown a supporting framework for the recorder, comprising a base plate 10, preferably of metal, having secured thereto upright studs or posts 11 which rigidly support an upper plate or frame member 12. The posts may be fastened to the plates 10 and 12 in any suitable manner, as by machine screws 15, Fig. 1, which pass through the plates and are screw-threaded into the adjoining ends of the supporting posts. The upper plate 12 carries a turntable 16 rotatably mounted by means of anti-friction bearings 17, Fig. 2. The turntable is driven by a motor 18 mounted on the plate 10, driving power being transmitted through a motor shaft 19, a reducing gear box 20, and a driven shaft 21 to which the turntable is secured, as by a pin or screw 22.

Turntable 16 is adapted to carry a magnetic recording and retransmitting plate or disc 25 constructed in accordance with the invention, and hereinafter described in detail, the disc being rotated by the turntable at a predetermined speed during recording and retransmitting operations. Preferably, and as shown in Figs. 1 and 2, the upper end of the shaft 21 has an enlarged head 23 of suitable configuration, for example, square, which passes through and engages a central opening of right configuration in the disc 25 for insuring positive rotation of the disc by the turntable.

One embodiment of the recording and reproducing disc 25 is illustrated in detail in Fig. 4, and comprises a plate of magnetizable steel having a spiral hill or ridge 26 cut or otherwise formed in the upper surface thereof, and preferably also having a similar spiral ridge 26' formed in the undersurface thereof. Coacting with the spiral ridge is the recording and reproducing head comprising two electromagnets 28 connected in series. Each of the magnets has a magnetic core 29 of relatively large cross-section having a free end of reduced cross-section positioned immediately adjacent to one of the tapered sides of the ridge 26, thereby to cause a high concentration of magnetic flux at the reduced end of each of the pole pieces for locally magnetizing, in the manner of a Poulsen wire, the immediately adjacent portions of the ridge 26 when facsimile or other signaling currents are passed through the coils of the magnets 28. The pole pieces of the magnets are maintained in proper position and spacing relative to the opposite sides of the ridge or hill 26 by means of a supporting guide member 31, the guide member having depending therefrom two prongs or tines 32 which are received in the valley portions formed by the spiral ridge 26. These tines support the weight of the recording and reproducing head and cause the reduced ends of the pole pieces to be spaced very close to the adjacent sides of the ridge 26 so as to provide a minimum length of operating air gap, while at the same time preventing friction between the pole pieces and ridge during rotation of the disc 25. The tines 32 also cause the recording and reproducing head to track properly at all times as the spiral ridge is being scanned thereby during recording or reproducing operations.

The magnets 28 and guide member 31 are secured to the forward end of a scanning arm 34, the rear end of which is pivotally mounted at a point 35, Figs. 1 to 3, to enable movement of the scanning head in a horizontal plane laterally across the face of the magnetizable disc 25 from the outermost rows 26*a*, Fig. 1, to the innermost rows 26*b* of the spiral ridge 26. The arm 34 also is pivoted by a bearing 36 in such manner that the forward portion of the arm and the scanning head carried thereby may be raised upwardly, as indicated in dotted outline in Fig. 3, to facilitate insertion or removal of the magnetizable disc. The forward portion of the arm 34 preferably has a longitudinal rib 39 to impart a desired strength and rigidity to the arm without unduly increasing the size or weight thereof. At the pivotal point 35 the arm may be rotatably mounted in any suitable manner. For example, and seen more clearly in Fig. 3, a supporting bracket member 40 is secured, as by machine screws or bolts 41, to an opposite portion 12*a* of the upper supporting plate member 12, the bracket carrying an adjustable pivotal screw 42. The rear of the arm 34 terminates in a bracket portion composed of a central vane 45 and flanged portion 46 secured to a stub shaft 47 which is rotatably mounted by anti-friction bearings 48 within the support 12*a*. Thus, during either a recording or reproducing operation, the tines 32 of the recording and reproducing head will track in the vales on either side of the spiral ridge 26 and cause the reproducer head to travel across the disc 25 to effect linear scanning at a rate determined by the rotational speed of the disc.

Preferably, and as seen in Figs. 2 to 4, a second scanning arm 50 is provided to scan the ridge on the underface of the magnetizable disc simultaneously with the upper scanning arm 34. This enables two messages to be recorded or retransmitted simultaneously, or one of the faces of the disc may be employed to record and retransmit synchronizing or other control signals to accompany the recorded message on the other face thereof, thereby insuring that the stylus or other reproducing means at a receiving station will scan the receiving record blank at the same rate as scanning was effected at the original transmitting station and in proper phase relation therewith.

The arm 50 carries at its forward end a reproducer head like that of arm 34. Arms 50 is mounted, by a pivoted bearing 51, to the bracket structure 45, 46, so that it moves directly beneath and in alignment with the arm 34 as scanning of both faces of the magnetizable disc proceeds. A contractile spring 54, Fig. 3, has one end secured to the arm 50 and its other end anchored to a rod 55 rigidly secured to the bracket structure 45, 46, and serves to resiliently urge the recording and reproducing head of the lower arm into operative position with respect to the ridge 26' on the underside of the disc. The outer end of arm 50 need be depressed only a slight distance in order to disengage its scanning head from the underside of disc 25, this clearance being required in order to facilitate insertion or removal of a disc from the turntable 16, and to enable the scanning arms 34 and 50 to be swung over to their starting points at the outer edge of the disc. To accomplish this, an operator or other attendant raises the outer end of the upper arm 34 a desired distance, with the pivotal bearing 36 as an axis of rotation, and by means of a cam 57, secured to the pivoted end of the upper arm, and a cam surface 59 on the lower arm 50, the lower arm automatically is cammed downwardly a distance just sufficient to clear the disc. The configuration of cam 58 is such that when the lower arm has been cammed downwardly to clear the disc, further upward movement of the arm 34 does not further depress the arm 50 but instead merely maintains the necessary clearance between the scanning head of the lower arm and the disc. Any lateral movement of arm 34 causes a corresponding movement of arm 50 and thus both arms may be positioned at any desired point with respect to the disc.

The lower arm carries an electrical contact spring 61 insulated from the arm, so that the free end of the contact spring slides across a rheostat or potentiometer coil 62 during lateral movement of the scanning arms thereby to vary the speed of the driving motor 18 in a manner to maintain substantially uniform linear scanning speed during a recording or reproducing operation, as hereinafter set forth. The spring 61 is sufficiently resilient to permit the arm 50 to be cammed downwardly the necessary distance to clear the disc whenever the upper arm 34 is raised. A leaf spring 64 secured at one end to the bracket structure 45, 46, assists in returning the arm 50 to its recording and reproducing position after it has been disengaged by the cam 57, the leaf spring also assisting in preventing downward movement of arm 50 in excess of that caused by the camming action of the cam 57.

The diameter of the recording and reproducing discs 25 employed may vary within considerable limits, depending upon the number of spiral scanning rows per inch, the rate of linear scanning desired, and the length of the messages to be transmitted. If, for example, the disc is formed with fifty spiral recording rows per inch, a disc 18 inches in diameter will permit linear scanning at a rate of approximately 6 feet per second for a period from 2½ to 3 minutes, and, thus enable the recordation or reproduction of a facsimile telegraph message of considerable length. For shorter messages a disc 15 or 16 inches in diameter will be sufficient. Such discs may conveniently be handled generally in the manner of phonograph discs.

Fig. 7 illustrates schematically a facsimile system in which recording and reproducing discs in accordance with the invention may be employed. The system comprises an originating office or subscribers' sending station S, a central receiving and retransmitting station C, and a receiving subscribers' station or a branch office R. Any suitable transmitting unit may be employed at station S and any suitable recording unit may be employed at station R, various of which units are well known in the art. For example, and by way of illustration only, the transmitting unit may comprise a photocell pickup device of a type heretofore employed for scanning subject matter to be transmitted in facsimile, such as the scanning device shown in Wise Patent No. 2,158,391, issued May 16, 1939. In general, such a scanning unit comprises a drum 70 which carries the record sheet bearing the subject matter to be transmitted, the drum being rotated at a predetermined constant speed by a synchronous or other constant speed motor 71 which is energized from an alternating current power supply line 72. As is known, a beam of light from a suitable light source 74 is focused, by means of a lens 75, on successive elemental areas of the subject matter blank being scanned, the beam being reflected from the record sheet through a lens 76 to a photocell 77. A light chopper in the form of a disc 73 is interposed between the photocell 77 and the reflected scanning light. Preferably a second photocell 78 is employed for obtaining picture inversion so that, as set forth in Wise Patent No. 2,176,442, issued October 17, 1939, the record as reproduced at the receiver will show dark portions when dark portions of the subject matter to be transmitted are scanned.

As is well known, the modulated carrier signals generated by the photocell, which are in accordance with the subject matter scanned by the transmitting unit, are amplified by an amplifier 79, the amplifier being connected by a transmission circuit 80 to a receiving amplifier 81 in the central station C. A manually operable switch 82 is provided to enable the recording and reproducing unit 28 to be connected either to amplifier 81 of the incoming line or to an amplifier 110 of an outgoing circuit. In the figure the switch is shown in position for receiving an incoming message from the transmitting station S. A transformer 24 is bridged across the output of amplifier 81, this secondary winding of the transformer being connected in circuit with a suitable signal device, such as a neon lamp 83, thereby to call the attention of a central office attendant to the fact that the sending station S has its carrier on and wishes to transmit a message. The carrier may have any suitable frequency, for example, 2500 cycles.

In order that the central station may prevent transmission from the sending station until a disc 25 is in proper position for recording a message, a control circuit is provided which comprises a source of current 86, a resistance 87 and a manually operable switch 88. When the switch is thrown to the right, the battery 86 is connected to a midpoint tap of a coil 89 that is bridged across the line 80. A similar coil 90 is bridged across the line at the transmitting station S, and a midpoint tap from the latter coil is connected through a relay 91 to ground. The armature 92 and make contact of relay 91 control a circuit which includes a source of energizing current 94 and an electromagnet 95 that controls the movement of the scanning carriage of the pickup unit, generally in the manner disclosed in Wise et al. Patent No. 2,262,715, issued November 11, 1941. As explained in the last-mentioned patent, the movable carriage which supports the photocell scanning assembly is advanced by a lead screw that propels the carriage at proper scanning speed when it is engaged by a half-nut, and the engagement and disengagement of the half-nut is controlled by electromagnet 95 so that when the electromagnet is deenergized, scanning cannot proceed, but when it is energized scanning is effected. Therefore, so long as switch 88 is not closed in the central office, transmission from station S cannot proceed, thus avoiding the possibility of transmission before the equipment at the central office is ready for reception of the message. A signal device, such as a lamp 96, is bridged across the electromagnet 95 in order to advise the attendant at station S of the condition of the equipment.

The driving motors at the transmitting and receiving stations should operate in synchronism and at the proper speed, and a convenient way of insuring this is illustrated in Fig. 7 in which the power supply 72 for the transmitting station is extended, by means of conductors 97 and manually operable switch 28 to the driving motor 18 of the recording and reproducing unit at the central station. This is feasible when the station S is comparatively close to the central station C, or when the local power supply at the central station is synchronized by the power company with the supply at station S. In the illustrative embodiment shown, one side of the power circuit is connected by a conductor 99 through the field winding of a universal driving motor 18 and thence through the armature of the motor, current limiting resistance 100, snap switch *s* (when closed) and conductor 101 to the other side of the power circuit. Connected in shunt with the armature is a circuit which includes the slidable contact 61 and resistance coil 62, the arrangement being such that as the arm 50 of the unit traverses the disc 25 from the outermost spiral grooves 26*a* to the innermost spiral grooves 26*b*, the speed of the motor will be progressively increased thereby to maintain the linear scanning speed constant irrespective of the diameter of that portion of the disc at the time being scanned. For example, when the outermost rows of an 18 inch disc are being scanned, the disc should be rotated at a speed of the order of 73 R. P. M. in order to give the desired linear scanning rate of 6 feet per second, whereas when the innermost rows 26*b* are being scanned the speed of the disc should be of the order of 228 R. P. M. If a 16 inch disc were employed, the rotational speed of the disc when the outer rows are being scanned would be of the order of 85 R. P. M. The resistance coil 62 has a portion 103 which is connected by a conductor 104 to the other side of the armature of motor 18 so as to insure that the proper amount of resistance will be in circuit at the beginning of a scanning operation by the reproducer head 28.

The resistances 62 and 103 act as a shunt across the armature of the motor, and are proportioned so that with the arm 50 in the starting position the correct linear scanning speed will be obtained, and as contact 61 is moved to the left, as viewed in Fig. 7, the resistance of the shunt increases and causes increase in the voltage across the armature thereby increasing the motor speed at a rate to maintain the linear scanning speed approximately constant.

The switch *s* is provided to insure that the recording unit will be stopped automatically at the proper time, that is, when the innermost rows 26*b* of the disc have been reached. As seen in Figs. 1 and 3, the bracket portion 46 of the swinging arms has a stud or pin 131 rigidly secured thereto. When the arms are swung over to the starting position, the stud 131 engages a rigid stop pin or stud 130 to determine the proper starting position for a given size of disc, and as scanning proceeds and the inner rows 26*b* are reached, the stud 131 engages and depresses a spring member 132 and causes operation of the snap switch *s* in order to open the motor energizing circuit and stop the recording and reproducing unit before the scanning head has passed the last of the innermost rows 26*b*. It is to be understood that any other suitable means for controlling the speed of the driving motor 18 and for controlling the starting and stopping of the recording and reproducing mechanism may be employed. When a recording has been effected on the disc 25, the switch 88 is thrown to the left, i. e., the position shown in Fig. 7, which prevents further transmission by the sending station S.

Retransmission of the recorded message at station C is effected by throwing switch 82 to the extreme right, thereby to connect the reproducing head 28 to the outgoing amplifier 110, and the motor 18 again is started by closing the switch 98. After passing through amplifier 110, the modulated carrier comprising the message passes through the band pass filter 111 and thence over line 112 to the band pass filter 114 at the receiving station R. From the filter 114 the message passes through the demodulator 115 after which the demodulated signals are amplified by an amplifier 116 and applied to a recording stylus 117 that records in facsimile the received message on a receiving blank carried by the recording drum 118. Recording may be effected in any suitable manner, for example, as on an electrosensitive recording blank of the character disclosed in Wise Patent 2,294,146, issued August 25, 1942; Kline Patent 2,251,742, issued August 5, 1941; or Kline et al. Patent 2,294,149, issued August 25, 1942. If it is desired to employ a percussive type recorder, thereby to obtain a recorded black and white copy from which other copies may be made by mimeograph, hectograph and other printing processes, the receiving apparatus may be in accordance with O'Brien et al. Patent 2,260,862, issued October 28, 1941, or d'Humy et al. Patent 2,301,024, issued November 3, 1942. Additional control circuits between the transmitting station S and the central station C, and between the central station and the receiving station R, may be employed, various of which circuits are shown in the patents hereinbefore referred to.

The underside of the disc 25 may be employed either for the recordation and retransmission of another message or for storing synchronizing signals to insure that the driving motors at the sending and receiving stations will operate in synchronism and in proper phase relation with respect to the transmitting and receiving subject matter blanks. This may readily be effected by extending the power source 97, which usually comprises a sixty cycle alternating current, through resistances 106 and 107 so that, when switch 108 is thrown to the left, as viewed in Fig. 7, the alternating current, usually sixty cycles, which drives the transmitting motor 71 at the sending station will be recorded, by means of reproducer head 28′, on the underside of disc 25 simultaneously with the recordation of a message on the upper side thereof. When retransmitting from the central station, switch 108 is thrown to the extreme right, and the recorded alternating current signals are transmitted to an amplifier 121, after which they pass to a modulator 122. In the modulator a source of carrier current of suitable frequency, for example, 4000 cycles, is modulated by the sixty-cycle alternating current and the modulated carrier passes through a filter 123 to the outgoing transmission line 112. At the receiving station R this modulated carrier is received by the band pass filter 124 and passed to a demodulator 125. The demodulated sixty-cycle current is amplified by an amplifier 126 and applied to the driving motor 119 of the recorder unit, thus insuring that motor 119 will always operate in synchronism and in proper phase relation with respect to the transmitting motor 71 of the sending station S.

After retransmission of the signals stored on the disc 25, it is desirable to erase the signals, whereby each disc may be used over and over again. This may be effected by providing erasing magnets similar to magnets 28 and 28′, which erasing magnets may be disposed immediately behind the recording and reproducing magnets and energized as retransmission is effected to erase the message signals as soon as they have been retransmitted. Such erasing magnets conveniently may be carried by the arms 34 and 50 generally in the manner of magnets 28 and 28′, it being understood that a suitable source of erasing current is applied to the erasing magnets at the proper times. Also, and as shown in Fig. 7, the magnets 28 and 28′ may be employed as erasing magnets. In this case, when the recorded signals have retransmitted, the switches 82 and 108 are moved to their midpoint positions, thereby disconnecting the magnets from the incoming and outgoing circuits. Switch 105 is then closed and supplies a source 151 of erasing current to both sets of magnets as the disc 25 is rotated and scanned by the magnets. Preferably, a source of alternating current having a frequency of the order of 30,000 cycles is employed as the erasing current.

Figs. 5 and 6 of the drawings show a modified form of recording and reproducing disc. In this case a disc 140 has secured to the upper and under surfaces thereof a ridge formed by a spiral ribbon 141 and 141′ of good magnetic properties. The edge of the ribbon adjoining the disc 140 may be secured thereto in any suitable manner, as by spot welding or otherwise, and the adjacent turns of the ribbon preferably are separated by a ribbon 143 which is of smaller width than ribbon 141, and which forms a vale and also a track for the scanning head. Ribbon 143 may comprise either magnetic material or nonmagnetic material such as brass, and it may be spot welded or otherwise secured to the base of disc 140. It will be understood that the signals are magnetically stored in the ridge formed by the upper edge portions of ribbon 141 and/or 141'. This construction has the advantage of lower cost than that in which the disc is cut or grooved in the manner of the disc of Fig. 4. The operations of recording and reproducing are effected in the same manner as heretofore explained with respect to disc 25.

In each of the modifications of the recording and reproducing discs shown herein, it is preferable that the diameter of the innermost row 26b be sufficiently great to avoid the necessity of rotating the disc at undesirably high speeds in order to maintain a desired linear scanning rate. It will generally be found that the diameter of the innermost row conveniently may be of the order of six inches. The blank space in the central portion of the disc may be employed for receiving stickers or identifying labels on which the designation of the sending and receiving stations may appear, or such stickers and labels may contain routing instructions or other information desired by the operator or attendant at the central station.

While the invention has been described and explained in detail in connection with specific illustrative embodiments thereof, it is to be understood that the invention may be embodied in other forms and that it is not limited except as indicated by the terms and scope of the appended claims.

What is claimed is:

1. Facsimile recording and reproducing apparatus comprising a rotatable disc having on each side thereof a spiral ridge of magnetizable material and a spiral vale on either side of said ridge, a recording and reproducing head for each side of said disc and each comprising an electromagnet responsive to incoming signals and having a pole piece for scanning successive areas of the adjacent spiral ridge and locally magnetizing selectable areas thereof as said disc is rotated, means for rotating the disc, a first scanning arm for carrying one of said recording and reproducing heads and a second scanning arm for carrying the other of said heads, means for mounting said arms so that they move in synchronism with each other for scanning both sides of the disc simultaneously, and means controlled by one of said scanning arms for continually increasing the rotational speed of said disc as scanning of the disc proceeds from the outer portion thereof to the inner portion thereof.

2. Facsimile recording and reproducing apparatus comprising a rotatable disc having the opposite faces thereof composed of magnetizable material, a recording and reproducing head for each side of said disc and each comprising an electromagnet responsive to incoming signals and having a pole piece for scanning successive areas of the adjacent face of the disc and locally magnetizing selectable areas thereof as said disc is rotated, means for rotating the disc, a first scanning arm for carrying one of said recording and reproducing heads and a second scanning arm for carrying the other of said heads, means for mounting said arms so that they move in synchronism with each other for scanning both sides of the disc simultaneously, means for simultaneously applying different sources of incoming signals respectively to the two recording and reproducing heads, and means controlled by one of said scanning arms for progressively varying the relative rotational speed between said pole pieces and the disc as spiral scanning of the disc proceeds from one diametral portion thereof to another portion thereof of different diameter.

3. Facsimile recording and reproducing apparatus comprising a rotatable disc having the opposite faces thereof composed of magnetizable material, a recording and reproducing head for each side of said disc and each comprising an electromagnet responsive to incoming signals and having a pole piece for scanning successive areas of the adjacent face of the disc and locally magnetizing selectable areas thereof as said disc is rotated, means for rotating the disc, a first scanning arm for carrying one of said recording and reproducing heads and a second scanning arm for carrying the other of said heads, means for mounting said arms so that they move in synchronism with each other for scanning both sides of the disc simultaneously, means for simultaneously applying different sources of incoming signals respectively to the two recording and reproducing heads, means including said heads for subsequently reproducing simultaneously the signals thus stored on opposite sides of the disc and separately applying them to different outgoing circuits respectively, and means controlled by one of said scanning arms for progressively varying the relative rotational speed between said pole pieces and the disc as spiral scanning of the disc proceeds from one diametral portion thereof to another portion thereof of different diameter.

FERNAND E. D'HUMY.
RALEIGH J. WISE.

REFERENCES CITED

The following references are of record in the file of this patent:

UNITED STATES PATENTS

| Number | Name | Date |
|---|---|---|
| 850,036 | Morin | Apr. 9, 1907 |
| 939,781 | Wooster | Nov. 9, 1909 |
| 1,827,051 | Thomas | Oct. 13, 1931 |
| 1,871,752 | Simonds | Aug. 16, 1932 |
| 2,247,847 | Pfeumer | July 1, 1941 |
| 2,300,209 | DeTor | Oct. 27, 1942 |
| 2,316,780 | Foster | Apr. 20, 1943 |
| 2,353,408 | Larsen | July 11, 1944 |
| 2,361,753 | Eilenberger | Oct. 31, 1944 |
| 2,374,704 | Ridings et al | May 1, 1945 |
| 2,386,263 | Ridings et al | Oct. 9, 1945 |

FOREIGN PATENTS

| Number | Country | Date |
|---|---|---|
| 322,033 | Great Britain | Nov. 28, 1929 |
| 512,766 | Great Britain | Nov. 30, 1937 |
| 347,094 | Germany | Jan. 22, 1919 |
| 457,479 | France | Sept. 18, 1913 |
| 558,207 | France | Aug. 23, 1923 |